US012459779B2

(12) United States Patent
Becerra Alvarado

(10) Patent No.: US 12,459,779 B2
(45) Date of Patent: Nov. 4, 2025

(54) ELECTRICAL CABLE SPOOL APPARATUS

(71) Applicant: JAMESON, LLC, Clover, SC (US)

(72) Inventor: Carlos Fernando Becerra Alvarado, Charlotte, NC (US)

(73) Assignee: Jameson, LLC, Clover, SC (US)

( * ) Notice: Subject to any disclaimer, the term of this patent is extended or adjusted under 35 U.S.C. 154(b) by 153 days.

(21) Appl. No.: 18/488,190

(22) Filed: Oct. 17, 2023

(65) Prior Publication Data

US 2025/0122047 A1 Apr. 17, 2025

(51) Int. Cl.
*B65H 75/40* (2006.01)
*H02G 1/06* (2006.01)

(52) U.S. Cl.
CPC ............. *B65H 75/403* (2013.01); *H02G 1/06* (2013.01); *B65H 2701/34* (2013.01)

(58) Field of Classification Search
CPC .... B65H 49/32; B65H 49/325; B65H 49/321; B65H 49/24
USPC ........................ 242/590, 596.4, 597.8, 598.5
See application file for complete search history.

(56) References Cited

U.S. PATENT DOCUMENTS

| | | | | | |
|---|---|---|---|---|---|
| 2,155,770 | A * | 4/1939 | Porter | B65H 75/2227 | 242/609.3 |
| 2,965,327 | A * | 12/1960 | Blary | B65H 75/403 | 242/594.6 |
| 5,692,701 | A * | 12/1997 | Holliday | B65H 49/321 | 242/598.5 |
| 6,086,013 | A * | 7/2000 | Looney, Jr. | B65H 49/321 | 242/598.5 |
| 6,299,100 | B1 * | 10/2001 | Cloud | B65H 49/32 | 242/391.1 |
| 7,261,271 | B1 * | 8/2007 | Buswell | B65H 49/321 | 248/431 |
| 7,270,293 | B1 * | 9/2007 | Karoly | B65H 49/321 | 242/598.5 |
| 7,784,729 | B1 * | 8/2010 | Hope | B65H 49/32 | 242/597.4 |
| 10,273,111 | B2 * | 4/2019 | Grabowski | B65H 49/321 | |
| 10,759,627 | B2 * | 9/2020 | Grabowski | B65H 49/38 | |
| 11,365,084 | B2 * | 6/2022 | Grabowski | B65H 49/321 | |
| 2002/0074447 | A1 * | 6/2002 | Schneider | B65H 57/26 | 242/588 |

(Continued)

FOREIGN PATENT DOCUMENTS

| | | | | |
|---|---|---|---|---|
| FR | 2889839 | A1 * | 2/2007 | B65H 49/30 |

*Primary Examiner* — Anna M Momper
*Assistant Examiner* — Ermia E. Melika
(74) *Attorney, Agent, or Firm* — Shumaker, Loop & Kendrick, LLP; S. Alexander Long, Jr.; Brian D. MacDonald

(57) ABSTRACT

An apparatus for assisting with cable installation is disclosed having a first and second pair of legs and an axle. The lower end of the first pair of legs is flat and the lower end of the second pair of legs is configured for releasably coupling to one or more wheels. When assembled, the first pair of legs form a first triangular arch, the second pair of legs form a second triangular arch, and the axle is threaded through the upper end of the pairs of legs such that the axle is parallel to a support surface. When a cable spool is coupled to the axle, the first pair of legs provides a stable, stationary support, the axle provides a level support for easily pulling cable from the spool, and the wheels on the second pair of legs allow the apparatus to be easily moved around a work site.

17 Claims, 6 Drawing Sheets

(56) References Cited

U.S. PATENT DOCUMENTS

| | | | | |
|---|---|---|---|---|
| 2009/0065663 | A1* | 3/2009 | Jordan | B65H 49/321<br>248/157 |
| 2009/0308963 | A1* | 12/2009 | Malkin | B65H 49/24<br>242/403 |
| 2015/0259173 | A1* | 9/2015 | Guiffault | B65H 49/325<br>242/401 |
| 2020/0062532 | A1* | 2/2020 | Rodriguez | B65H 49/321 |

* cited by examiner

ELECTRICAL CABLE SPOOL APPARATUS

TECHNICAL FIELD

The present disclosure generally relates to an apparatus for transporting and suspending electrical cables, and more particularly, to a device for easing the installation process of electrical cables, telecommunication cables, and other similar products.

BACKGROUND

Cable installation, including electrical and optical cables, involves safely routing and connecting the cables for power and telecommunications services, such as telephone, internet, and television. During cable installation indoors, a variety of cables may be required to complete the installation. Thus, depending on the project, installation may require different cables with different characteristics such as size, shape, and function. Typically, electrical cables are presented in reels or spools. However, depending upon the characteristics of the particular electrical cable, the reels may have varying sizes including various diameters, lengths, widths, weight, etc.

The installation process requires a technician to unwind the cable from the particular spool. However, if the spool or reel is placed on a flat support surface, the technician may have difficulty unwinding the cable from the spool. In addition, when the spool is new, the spool may be too heavy or unwieldy to easily move from one location to the next during the installation. These factors, in turn, may cause the installation process to take longer than expected and may drive up installation costs.

Additionally, most projects require more than one type of cable to complete the installation process. However, constantly moving or organizing the spools of cable so that they are located near each other can also be time consuming and costly.

Thus, a need exists for a device that has the ability to hold several types of spools together and allow each of them to rotate independently, while also maintaining their location within the job site. A need also exists for a device that can be easily transported to various locations at the jobsite and between job sites, including the need for a device that can be easily collapsed, folded, or disassembled for transporting or storing the device.

SUMMARY

This summary is provided to briefly introduce concepts that are further described in the following detailed descriptions. This summary is not intended to identify key features or essential features of the claimed subject matter, nor is it to be construed as limiting the scope of the claimed subject matter.

In example embodiments, a cable installation apparatus is disclosed having a first pair of legs, a second pair of legs, and an axle. The first pair of legs includes a first leg and a second leg. The second pair of legs includes a third leg and a fourth leg. The first leg is configured for releasably coupling to the second leg to form a first triangular arch with respect to a support surface. Similarly, the third leg is configured for releasably coupling to the fourth leg to form a second triangular arch with respect to the support surface. The axle may then be releasably coupled to the first triangular arch and the second triangular arch by inserting the axle through upper ends of the first pair of legs and the second pair of legs, respectively. When the axle is coupled to the first triangular arch and the second triangular arch, the axle is parallel to the support surface.

According to example embodiments, a cable installation apparatus is disclosed having a first leg assembly, a second leg assembly, and an axle. The first leg assembly includes an upper end and a lower end, where the first leg assembly upper end is ring-shaped and the first leg assembly lower end is flat. The second leg assembly also includes an upper end and a lower end, where the second leg assembly upper end is also ring-shaped while the second leg assembly lower end includes a wheel axle that is configured for releasably coupling to one or more wheels. The axle is a rounded tube configured for receiving an electrical cable spool. When the axle is inserted into the first leg assembly upper end and the second leg assembly upper end, the first leg assembly forms a first triangular arch, the second leg assembly forms a second triangular arch, and the axle is substantially horizontal with a generally flat support surface.

Various example embodiments disclosed include a method of using a cable installation device by providing a cable installation device and assembling the device. The cable installation device includes a first leg assembly having an upper end and a lower end, where the first leg assembly upper end is ring-shaped and the first leg assembly lower end is flat. The device further includes a second leg assembly having an upper end and a lower end, where the upper end is ring-shaped and the lower end has at least one wheel axle. The device further includes an axle and one or more fastening mechanisms, where the axle is tube-shaped. The method includes (1) inserting the axle into the first leg assembly upper end; (2) inserting the axle into the second leg assembly upper end; (3) coupling a first fastening mechanism of the one or more fastening mechanisms to the first leg assembly upper end; (4) coupling a second fastening mechanism of the one or more fastening mechanisms to the second leg assembly upper end; (5) tightening the first fastening mechanism to prevent rotation of the axle within the first leg assembly ring-shaped upper end; and (6) tightening the second fastening mechanism to prevent rotation of the axle within the second leg assembly ring-shaped upper end.

The above summary is to be understood as cumulative and inclusive. The above described embodiments and features are combined in various combinations in whole or in part in one or more other embodiments.

BRIEF DESCRIPTION OF THE DRAWINGS

The previous summary and the following detailed descriptions are to be read in view of the drawings, which illustrate some, but not all, embodiments and features as briefly described below. The summary and detailed descriptions, however, are not limited to only those embodiments and features explicitly illustrated.

DETAILED DESCRIPTIONS

Figure 1:
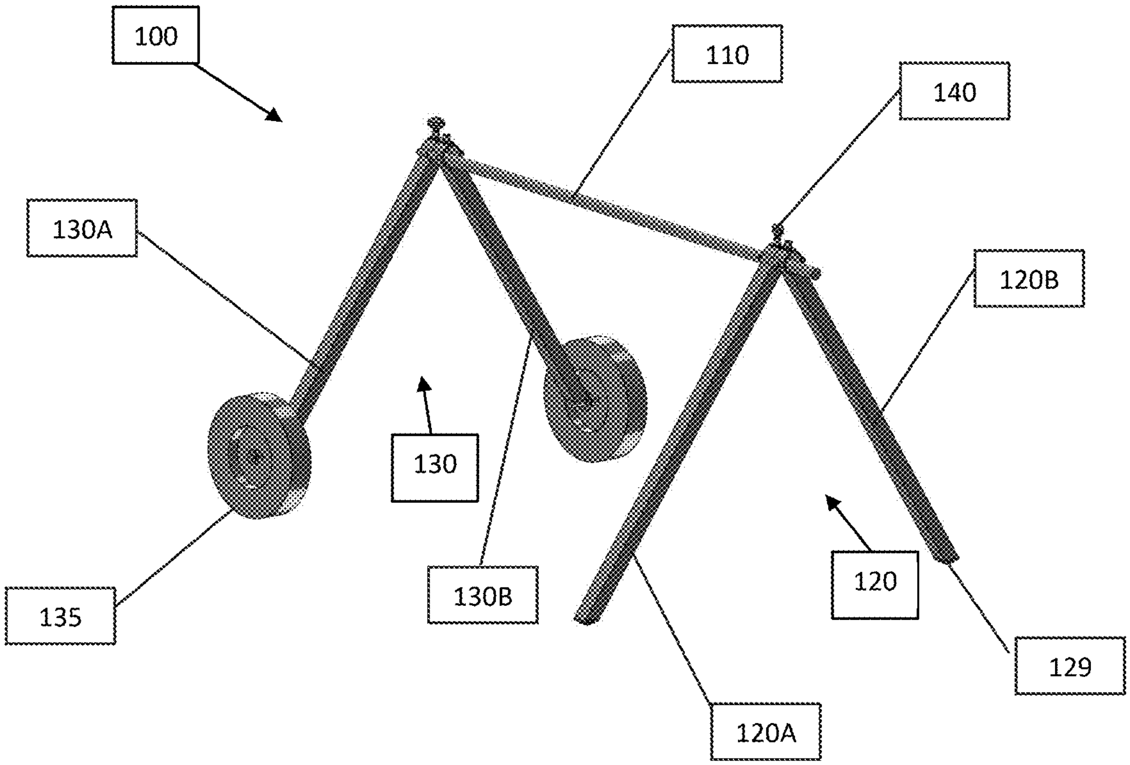
FIG. 1 is a perspective view of an electrical cable spool apparatus, in accordance with an embodiment of the present invention.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although steps may be expressly described or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Like reference numbers used throughout the drawings depict like or similar elements. Unless described or implied as exclusive alternatives, features throughout the drawings and descriptions should be taken as cumulative, such that features expressly associated with some particular embodiments can be combined with other embodiments.

Unless defined otherwise, technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a," "an," and "the" refer to "one or more" when used in the subject specification, including the claims. Unless indicated to the contrary, the numerical parameters set forth in the instant specification and attached claims are approximations that can vary depending upon the desired properties sought to be obtained within the scope of these descriptions. As used herein, the term "about," when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are within the scope of these descriptions.

Referring to FIGS. 1-8, a cable spool apparatus 100, such as an apparatus for an electrical cable spool 200, is disclosed for installing one or more cables at a job site and for easily moving and transporting the one or more cable spools using the device or apparatus. In various embodiments, the cable spool apparatus 100 is particularly beneficial in assisting a technician with installing one or more telecommunications cables as it allows the user to set up the device at a preferred location, releasably couple one or more spools of cable to the device, and then easily unwind the cable for installation at the job site.

In example embodiments, the cable spool apparatus 100 generally includes an axle 110, a first set of stationary legs 120, and a second set of wheeled legs 130. The axle 110 is generally rod-like in shape and may be any suitable length. For example, the axle 110 may be between about 5" and 35", more preferably about 10" to about 30", for example about 20" to about 28". In some embodiments, the apparatus 100 may include one or more axles having varying outer diameters and/or lengths that allow the device 100 to be appropriate for use at a variety of different work sites with spools of various sizes. In various embodiments, the axle 110 may include one or more telescoping components that enable the axle to be lengthened or shortened for use, storage, and/or transport. In particular embodiments, the axle 110 includes a generally round cross-section. In alternate embodiments, any suitably shaped cross-section may be used to receive, retain, and allow a spool of cable or other material to rotate when installed on the axle. For example, in a preferred embodiment, the axle 110 is a round tube because cable spools generally have a round arbor. However, in some embodiments, the axle may be customized to fit a cable spool having a square-shaped arbor, where the entire axle rotates with respect to the device rather than the spool rotating around the axle as the cable is pulled from the spool. In various embodiments, any tube having sufficient rigidity may be used as an axle. Thus, the axle may be formed of any suitable material including, but not limited, wood, metal, fiberglass, plastic polymer, etc.

According to example embodiments, the stationary legs 120 generally include a first leg 120A and a second leg 120B, the second leg being generally identical to the first leg. Thus, for purposes of clarity and ease of understanding, the description will be directed to both stationary legs 120, with the understanding that the stationary legs are interchangeable and generally identically formed. The stationary legs 120 are generally rod-like in shape and may be any suitable length. For example, the stationary legs 120 may be between about 5" and 35", more preferably about 10" to about 30", for example about 20" to about 28". In example embodiments, one stationary leg is positioned in front of the other for coupling the legs 120 together. This arrangement also allows for additional stability for the device 100. In alternate embodiments, the stationary legs 120 may be aligned such that the legs align with each other, one leg may be longer than the other such that the legs are stacked, etc. However, in the interest of modularity and simplicity, the legs are preferably identical and interchangeable. In example embodiments, when the legs 120 are coupled to one another, they create a triangular shaped arch above the support surface.

In alternate embodiments, although shown with two stationary legs, any number of legs may be used. For example, the device 100 may include only one stationary leg. In this example embodiment, it is understood that the base of the singular stationary leg would need to be configured (e.g., sized and shaped) to sufficiently support the weight of the one or more spools placed on the device as well as to prevent the device from moving as the cables are pulled from the one or more spools installed on the device 100. For instance, a base or larger foot may be coupled to the second end of the 120B to support the device on a support surface.

Figure 2:
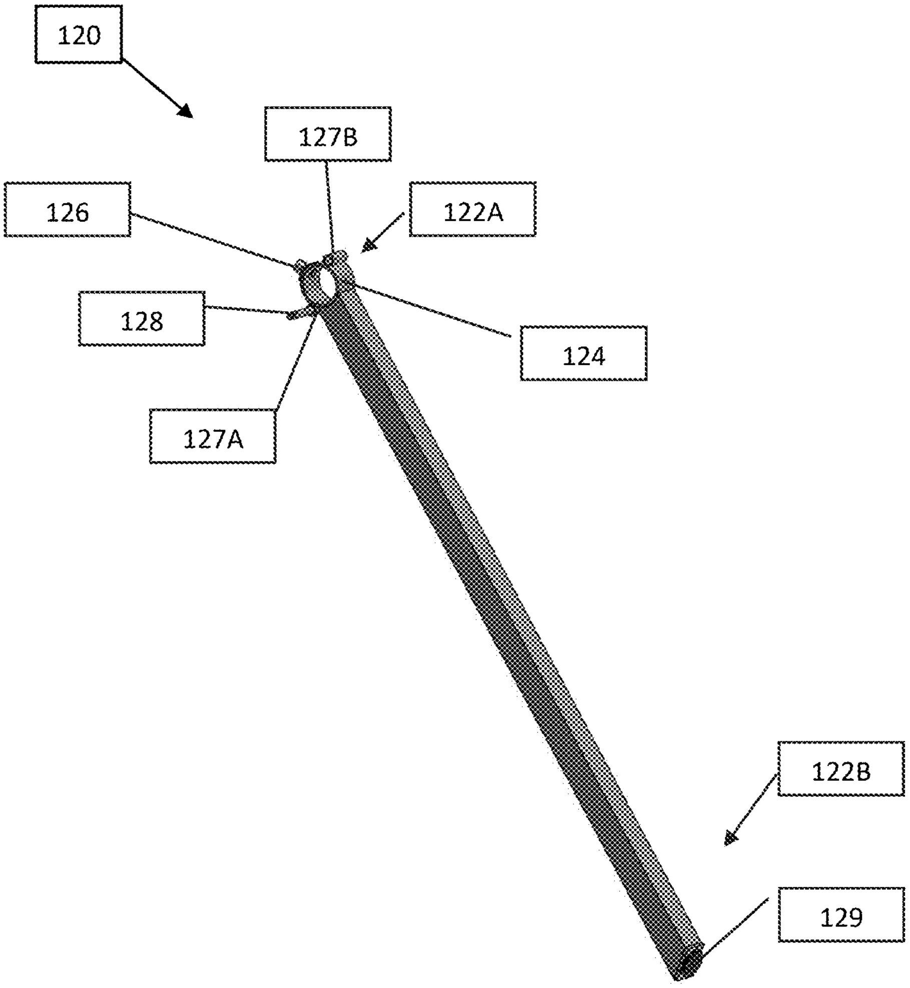
FIG. 2 is a perspective view of a stationary leg of the electrical cable spool apparatus of FIG. 1.
Figure 4:
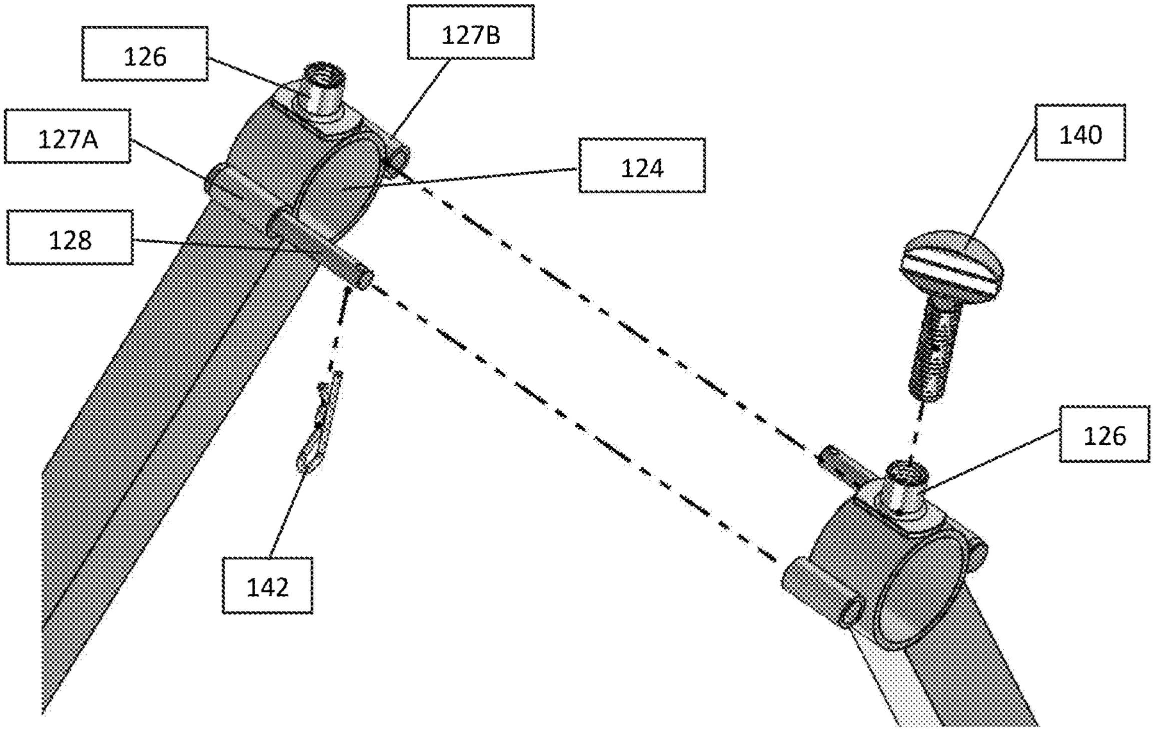
FIG. 4 is a partial exploded view of an upper leg joint of the stationary leg of FIG. 2 and/or the wheeled leg of FIG. 3.
Figure 5:
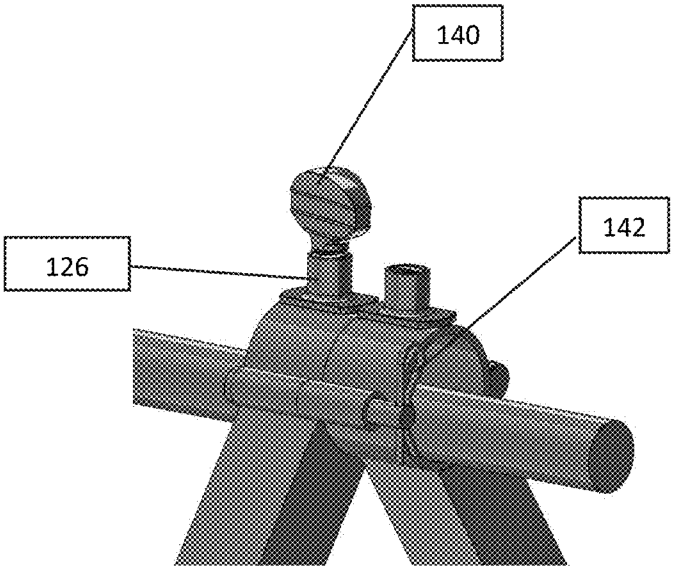
FIG. 5 is a partial perspective view of the upper leg joint of the stationary leg of FIG. 2 and/or the wheeled leg of FIG. 3 in an assembled configuration.

Referring to FIGS. 2 and 4-5, in example embodiments, the stationary legs 120 include a first or upper end 122A and a second or lower end 122B. Proximate the first end 122A, the stationary legs 120 each have an axle ring or holder 124 for receiving the axle 110. In particular embodiments, the axle rings 124 have a round inner circumference, which allows an axle 110 having a round cross-section (or round outer circumference) to be easily installed within the axle ring 124. In example embodiments, the axle ring inner diameter is between about 10 mm to about 50 mm, more preferably about 20 mm to about 40 mm, for example about 30 mm to about 35 mm.

A threaded coupling 126 extends from an opening in the axle ring 124. The threaded coupling 126 is configured for receiving a fastening device 140, such as, but not limited to, a spade bolt, as shown in FIGS. 4-5. In example embodiments, the threaded coupling 126 has an axis generally perpendicular to the axis of the axle ring 124. The threaded coupling 126 allows axles 110 of various widths to be properly coupled to the legs 120 to prevent movement of the axle once installed. Although described as a threaded coupling, any suitable coupling or receiving mechanism may be used to fixedly secure the axle 110 to the axle rings 124.

Turning specifically to FIGS. 4-5, coupled to opposing sides of the axle ring 124, and each having an axis running parallel to the axis of the opening of the axle ring is a first rod receiver 127A and a second rod receiver 127B. In example embodiments, the rod receivers 127A, 127B have a generally round cross-section and each are configured for receiving a rod 128 for releasably coupling the first leg 120A to the second leg 120B. In this regard, as the legs 120 are identical, the legs may be coupled together in any suitable configuration/orientation. In alternate embodiments, a rod 128 may be fixedly coupled to the first rod receiver 127A of the first leg 120A, which reduces the risk of lost parts at a job site or in between work sites, and reduces the number of parts in the assembly, which reduces costs. In particular embodiments, a hairpin or cotter pin 142 may be used to releasably couple the legs 120 together and retain the rods 128 within the respective rod receivers once the legs have been aligned, allowing the rods to be inserted into the corresponding rod receivers of the other leg, as shown in FIG. 4. In alternate embodiments, any suitable fastener may be used to secure the rod in the apertures of the rod receivers.

Referring again to FIG. 2, the second ends 122B of the stationary legs 120 are generally flat with respect to a support surface when the legs are coupled to one another. In example embodiments, proximate the stationary legs 120 second end 122B, a pad or bumper 129 is permanently or semi-permanently coupled to the stationary leg. In some embodiments, the pad 129 may be releasably coupled to the stationary legs for replacing the pad after normal wear and tear. For example, the pad or bumper 129 may be secured to the base of the leg using any suitable fastening mechanism (i.e., adhesive, screw, pin, friction-fit, etc.).

Figure 3:
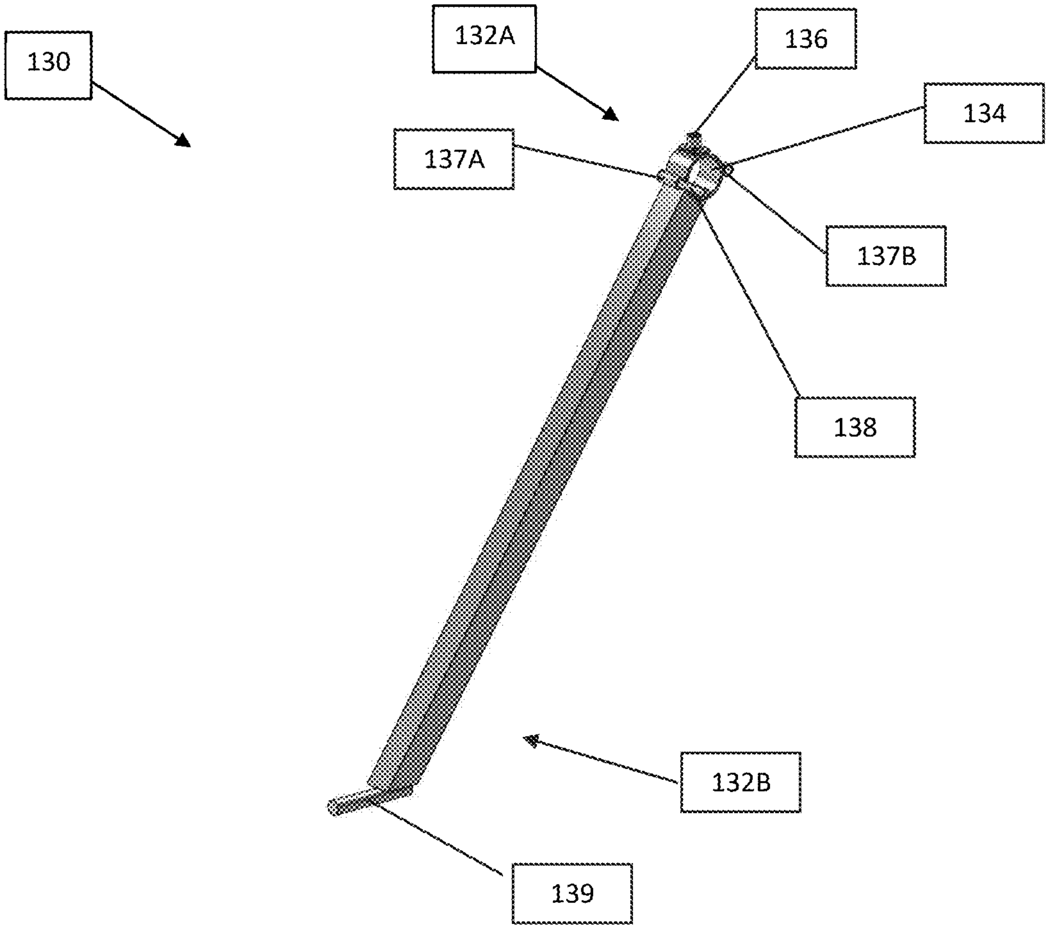
FIG. 3 is a perspective view of a wheeled leg of the electrical cable spool apparatus of FIG. 1 without a wheel.

As shown in FIGS. 1 and 3, the wheeled legs 130 generally include a first wheeled leg 130A and a second wheeled leg 130B, the second wheeled leg being generally identical to the first wheeled leg. In example embodiments, when the legs 130 are coupled to one another, they create a triangular shaped arch above the support surface. For purposes of clarity and ease of understanding, the description will be directed to both wheeled legs 130, with the understanding that the wheeled legs are interchangeable with each other and generally identically formed. In example embodiments, similar to the stationary legs 120, the wheeled legs are assembled such that one leg 130A is positioned in front of the other leg 130B. This arrangement aids the overall stability of the device 100. In alternate embodiments, the wheeled legs 130 may be positioned or oriented in any suitable arrangement/alignment. Additionally, although shown with two wheeled legs, any number of legs may be used.

Figure 7:
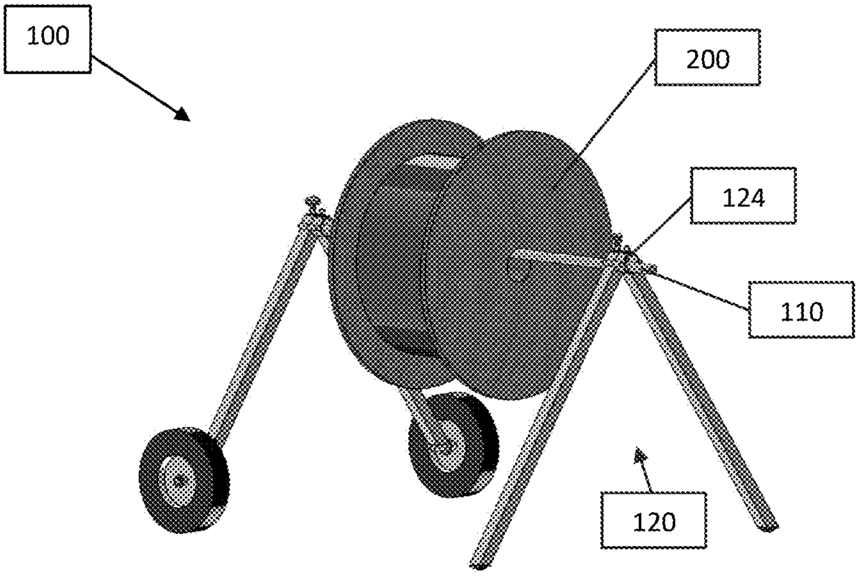
FIG. 7 is a perspective view of the electrical cable spool apparatus of FIG. 1 with an example cable spool installed.

In example embodiments, the wheeled legs 130 are generally rod-like in shape and may be any suitable length, but preferably are shorter in length than the stationary legs 120 so that when the device 100 is in a resting position on a generally flat support surface (as shown in FIG. 7), the axle 110 is generally parallel with the support surface to maintain any spool on the axle in a level position/orientation. For example, the wheeled legs 130 may be between about 4" and 34", more preferably about 9" to about 29", for example about 19" to about 27".

Each wheeled leg 130A, 130B includes a first or upper end 132A and a second or lower end 132B. The wheeled legs upper end 132A is generally identical to the upper end 122A of the stationary legs 120. Thus, for purposes of clarity and ease of understanding, only the differences between the wheeled legs 130 and the stationary legs 120 will be discussed. However, it should be understood that the wheeled legs 130 generally include an axle ring or holder 134, a threaded coupling 136, a first and second rod receiver 137A, 137B, a rod 138, a fastening device 140, and hairpin or cotter pin 142—where each part is the same as, comparable, and/or interchangeable with the corresponding elements discussed with reference to the stationary legs 120.

Figure 6:
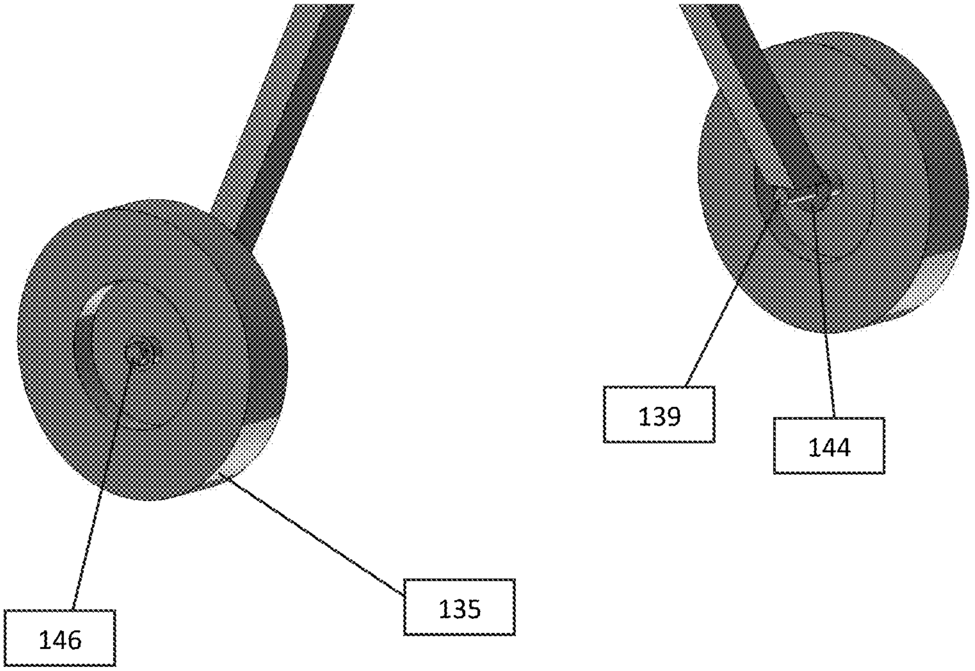
FIG. 6 is a partial perspective view of a set of wheeled legs of the electrical cable spool apparatus of FIG. 1.

Referring specifically to FIGS. 3 and 6, proximate the wheeled legs 130 second end 132B, a wheel axle 139 is permanently or semi-permanently coupled to the wheeled legs. For example, the wheel axle 139 may be integrally formed or formed separately and assembled together. The wheel axle 139 is intended to extend to an exterior side of the device 100 for receiving a wheel 135. The wheel 135 is coupled to the wheel axle 139 via a washer 144 and a retainer 146, as shown in FIG. 6. As may be understood in the art, any suitable attachment mechanism may be used to rotatably couple the wheel 135 to the wheel axle 139. Similarly, any suitable wheel may be used, as is known in the art or may later be developed, to assist with rolling the device 100 across or over a support surface (e.g., the floor). In particular embodiments, the wheels 135 are formed of rubber or other soft material so that the device can be used at an indoor work site such as at a customer's home or business that may have floors that could potentially be damaged by a less resilient material.

As can be seen in FIG. 7, in example embodiments, the axle 110 may extend through the stationary legs 120 axle rings 124 to allow a user to lift the front end of the device (e.g., the end with the stationary legs) to wheel the device around a work site. In various embodiments, a handle or other pull (not shown or numbered) may be coupled to any portion of the stationary legs 120 or the axle 110 to assist with moving/wheeling the device around a work site.

Figure 8:
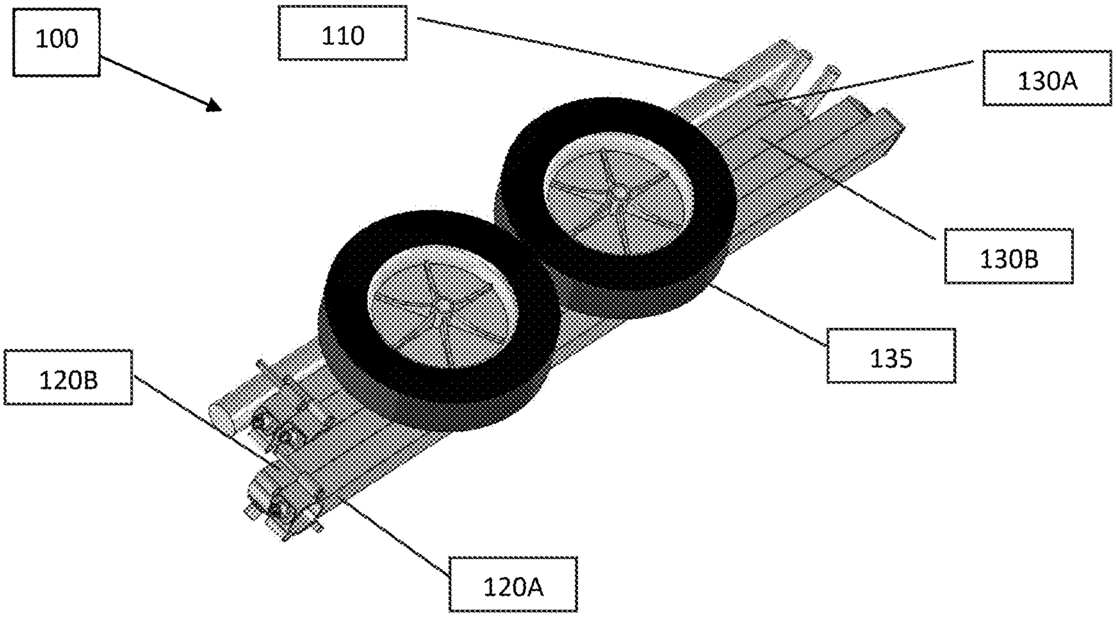
FIG. 8 is a perspective view of the electrical cable spool apparatus of FIG. 1 in a disassembled configuration.

The device 100 is configured such that it may be easily assembled, as shown in FIG. 1, or disassembled, as shown in FIG. 8. FIG. 7 depicts the device 100 in an assembled configuration with a cable spool 200 rotatably coupled to the device. In contrast, FIG. 8 depicts the device 100 in a disassembled configuration, which is beneficial for shipping, transporting, and storing the device. In example embodiments, the disassembled device 100 provides a smaller cube size, which results in lower shipping costs when the device or product is initially sold/purchased.

In example embodiments, the device 100 is configured to have a substantially minimal volumetric or spatial containment envelope or cube size (length (L)×width (W)×height (H)) when disassembled and packaged as compared to other spool holders, which is to accommodate transporting or relocating the device within a work site such as a home or office that may include narrow doorways or passageways, or for storing or transporting the device when not in use. In one example, the device 100 packaging or box size comprises a volumetric envelope of no more than about (2.333 ft (L)× 0.708 ft (W)×0.375 ft (H). In alternate embodiments the volumetric envelope is no more than about 89.25 $ft^3$, in another alternate embodiments the volumetric envelope is no more than about 65.625 $ft^3$, in another embodiment no more than about 45 $ft^3$, in yet another embodiment no more than about 37.5 $ft^3$, or in another embodiment no more than about 33.75 $ft^3$.

Furthermore, the volumetric envelope of the device 100 itself can alternatively be calculated by overall floor area ratio of the device as calculated by surrounding or circumscribing the outer contour of the assembled legs 120, 130 of the device along with the height of the assembled legs. Thus, in another form, the device 100 comprises a volumetric envelope (π(pi)×radius2 ((D/2)2)×height (H)).

Optionally, the volumetric envelop can be calculated using other shapes, for example, a triangular prism or other geometrical envelope generally surrounding the device 100. Preferably, the volumetric envelope is calculated in such a manner that any cable spool 200 coupled to the device 100 and extending outside the envelope is not considered an outer dimension of the device for calculation purposes. Preferably, as described above, since the device 100 is configured for rolling along a substantially vertical motion path due to being guided by axle 110, the lateral motion of the device is substantially minimal and thus allows for a reduction to the area (length×width) of the overall device. For example, the projected square footage occupied by the device or unit 100 may be between about 29" (L)×27" (W).

To assemble the device 100, the wheels 135 are coupled to the wheel axles 139. The stationary legs 120 are coupled to one another by inserting the respective rods 128 into the corresponding rod receivers 127B and attaching a cotter pin 142 to the end of each rod. Similarly, the wheeled legs 130 are coupled to one another by inserting the respective rods 138 into the corresponding rod receivers 137B and attaching a cotter pin 142 to the end of each rod. Next, the axle 110 is threaded through the stationary leg axle rings 124 and the wheeled leg axle rings 134 and secured in place with one or more fastening devices 140 coupled to the one or more threaded couplings 126, 136. In particular embodiments, to assist with stability, the fastening device 140 is coupled to the outer legs of the assembly 100.

Disassembling the device 110 entails the opposite actions occurring. Because of the interchangeability of the parts, the device may be assembled or disassembled in any suitable order. Additionally, when assembling the device 100, because any suitable axle may be used, the legs 120, 130 may be positioned at varying positions along the axle.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A cable installation apparatus, the apparatus comprising:
- a first pair of legs, the first pair of legs comprising a first leg and a second leg;
- a second pair of legs, the second pair of legs comprising a third leg and a fourth leg; and
- an axle,
- wherein the first leg comprises a first end configured for releasably coupling to a first end of the second leg to form a first triangular arch with respect to a support surface, wherein the third leg is configured for releasably coupling to the fourth leg to form a second triangular arch with respect to the support surface; wherein the axle is releasably coupled to the first triangular arch and the second triangular arch, and wherein when the axle is coupled to the first triangular arch and the second triangular arch, the axle is parallel with the support surface, and
- wherein:
- the first end of the first leg comprises a first axle ring around an axis for receiving a first portion of the axle;
- the first axle ring comprises a first rod parallel to the axis of the first axle ring, and a rod receiver;
- the first end of the second leg comprises a second axle ring around an axis for receiving a second portion of the axle adjacent the first portion of the axle; and
- the second axle ring comprises:
  - a second rod parallel to the axis of the second axle ring for insertion into the rod receiver of the first axle ring upon the first leg coupling to the second leg; and
  - a rod receiver for receiving the first rod upon the first leg coupling to the second leg.

2. The cable installation apparatus of claim 1, wherein the first leg is identical to the second leg.

3. The cable installation apparatus of claim 1, wherein the third leg is identical to the fourth leg.

4. The cable installation apparatus of claim 1, wherein the first pair of legs comprise flat-bottomed legs.

5. The cable installation apparatus of claim 1, wherein the second pair of legs comprise wheeled legs.

6. The cable installation apparatus of claim 1, wherein the first leg and the second leg each comprise a second end comprising a flat end.

7. The cable installation apparatus of claim 6, wherein the third leg and the fourth leg each comprise a second end comprising a wheel axle for receiving a wheel.

8. The cable installation apparatus of claim 7, wherein each axle ring is intermediate each respective rod and rod receiver.

9. The cable installation apparatus of claim 8, wherein each axle ring of the third leg and the fourth leg is identical to the first leg and the second leg axle rings.

10. The cable installation apparatus of claim 9, wherein each axle ring of the first leg, second leg, third leg, and fourth leg comprises a coupling for receiving a fastening device, wherein when the fastening device is received by the coupling, the fastening device is configured for securing the axle to at least one of the first pair of legs and the second pair of legs to prevent movement of the axle.

11. A cable installation apparatus, the apparatus comprising:
- a first leg assembly, the first leg assembly comprising an upper end and a lower end, wherein the first leg assembly upper end is ring-shaped and the first leg assembly lower end is flat;

a second leg assembly, the second leg assembly comprising an upper end and a lower end, wherein the second leg assembly upper end is ring-shaped and the second leg assembly lower end comprises a wheel axle, and wherein one or more wheels are releasably coupled to the wheel axle; and an axle, wherein the axle comprises a rounded tube, wherein when the axle is inserted into the first leg assembly upper end and the second leg assembly upper end, the first leg assembly forms a first triangular arch, the second leg assembly forms a second triangular arch, and the axle is substantially parallel with a generally flat support surface, wherein the first leg assembly comprises a first leg having a ring-shaped upper end, and a second leg having a ring-shaped upper end, wherein the second leg assembly comprises a third leg having a ring-shaped upper end, and a fourth leg having a ring-shaped upper end, and wherein each respective ring-shaped upper end of the first left, the second leg, the third leg, and the fourth leg comprises a respective rod, a respective rod receiver, and a respective axle ring intermediate the respective rod and the respective rod receiver.

12. The cable installation apparatus of claim 11, wherein each respective ring-shaped upper end of the first leg, second leg, third leg, and fourth leg comprise a respective coupling for receiving a respective fastening device, wherein when the fastening device is received by the coupling, the fastening device is configured for securing the axle to at least one of the first pair of legs and the second pair of legs to prevent movement of the axle.

13. A method of using a cable installation device, the method comprising:

providing a cable installation device, wherein the cable installation device comprises:

a first leg assembly, the first leg assembly comprising an upper end and a lower end, wherein the first leg assembly upper end is ring-shaped and the first leg assembly lower end is flat;

a second leg assembly, the second leg assembly comprising an upper end and a lower end, wherein the second leg assembly upper end is ring-shaped and the second leg assembly lower end comprises a wheel axle;

an axle, wherein the axle comprises a tube, one or more fastening mechanisms;

inserting the axle into the first leg assembly upper end;

inserting the axle into the second leg assembly upper end;

coupling a first fastening mechanism of the one or more fastening mechanisms to the first leg assembly upper end;

coupling a second fastening mechanism of the one or more fastening mechanisms to the second leg assembly upper end;

tightening the first fastening mechanism to prevent movement of the axle within the first leg assembly ring-shaped upper end; and tightening the second fastening mechanism to prevent movement of the axle within the second leg assembly ring-shaped upper end, wherein the first leg assembly comprises a first leg having a ring-shaped upper end, and a second leg having a ring-shaped upper end, wherein the second leg assembly comprises a third leg having a ring-shaped upper end, and a fourth leg having a ring-shaped upper end, and wherein each respective ring-shaped upper end of the first left, the second leg, the third leg, and the fourth leg comprises a respective rod, a respective rod receiver, and a respective axle ring intermediate the respective rod and the respective rod receiver.

14. The method of claim 13, wherein the method further comprises releasably coupling one or more wheels to the wheel axle.

15. The method of claim 13, wherein inserting the axle into the first leg assembly upper end further comprises positioning the axle to extend through and beyond an outer edge of the ring-shaped upper end, wherein the axle extension is configured to operate as a handle for the cable installation device.

16. The method of claim 13, the method further comprising:

removing the first fastening mechanism from the first leg assembly;

removing the second fastening mechanism from the second leg assembly;

removing the axle from the first leg assembly;

removing the axle from the second leg assembly;

separating the first leg assembly into the first leg and the second leg;

separating the second leg assembly into the third leg and the fourth leg;

arranging the axle, first leg, second leg, third leg, and fourth leg into a cuboid configuration, wherein the cuboid configuration comprises a volumetric envelope.

17. The method of claim 16, wherein the volumetric envelope has a volume defined by the equation: ($V=L\times W\times H$), wherein "V" is the volume of the volumetric envelope, "L" is the length of the cuboid configuration, "W" is the width of the cuboid configuration, and "H" is the height of the cuboid configuration, and wherein the volume of the volumetric envelope is no more than approximately 0.62 $ft^3$.

* * * * *